(12) United States Patent
Hayata

(10) Patent No.: US 6,514,651 B1
(45) Date of Patent: Feb. 4, 2003

(54) METAL PHTHALOCYANINE CRYSTAL PARTICLES, PRODUCTION METHOD THEREOF, AND ELECTROPHOTOGRAPHIC PHOTORECEPTOR AS WELL AS ELECTROPHOTOGRAPHIC PROCESS USING THE SAME

(75) Inventor: Hirofumi Hayata, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/583,646

(22) Filed: May 30, 2000

(30) Foreign Application Priority Data

May 31, 1999 (JP) ............................ 11-151832

(51) Int. Cl.[7] .............................. G03G 5/04; G03G 5/06
(52) U.S. Cl. ........................... 430/56; 430/78; 430/135; 540/139; 540/140; 540/141
(58) Field of Search ....................... 430/78, 135, 56; 540/139, 140, 141

(56) References Cited

U.S. PATENT DOCUMENTS

| 4,443,528 | A | * | 4/1984 | Tamura et al. | 430/78 |
|---|---|---|---|---|---|
| 5,336,578 | A | * | 8/1994 | Nukada et al. | 430/78 |
| 5,368,965 | A | * | 11/1994 | Fujimori et al. | 430/59.4 |
| 5,427,616 | A | * | 6/1995 | Tsuji et al. | 540/141 |
| 5,443,935 | A | * | 8/1995 | Kojima et al. | 430/78 |
| 5,521,306 | A | * | 5/1996 | Burt et al. | 540/141 |
| 5,773,181 | A | * | 6/1998 | Molaire et al. | 430/78 |

FOREIGN PATENT DOCUMENTS

| EP | 401 782 A2 | * | 12/1990 |
|---|---|---|---|
| JP | 350553 | | 3/1991 |
| JP | 75715 | | 1/1995 |
| JP | 7114196 | | 5/1995 |
| JP | 7128889 | | 5/1995 |
| JP | 8110649 | | 4/1996 |
| JP | 9157540 | | 6/1997 |
| JP | 2754739 | | 3/1998 |
| JP | 10186703 | | 7/1998 |

OTHER PUBLICATIONS

Schaffert, R.M. Electrophotography. New York: John Wiley & Sons. pp. 50–51. (1975).*

* cited by examiner

Primary Examiner—Christopher Rodee
(74) Attorney, Agent, or Firm—Bierman, Muserlian and Lucas

(57) ABSTRACT

A composite metal phthalocyanine crystal particle is disclosed. In the composite metal phthalocyanine crystal particle, metal phthalocyanine compound A in an amount of at least 0.001 to less than 0.1 weight part is uniformly dispersed at the molecular level in 100 weight parts of metal phthalocyanine compound B which has a different chemical structure from said metal phthalocyanine compound A.

10 Claims, No Drawings

METAL PHTHALOCYANINE CRYSTAL PARTICLES, PRODUCTION METHOD THEREOF, AND ELECTROPHOTOGRAPHIC PHOTORECEPTOR AS WELL AS ELECTROPHOTOGRAPHIC PROCESS USING THE SAME

FIELD OF THE INVENTION

The present invention relates to metal phthalocyanine crystal particles, a production method thereof, and an electrophotographic photoreceptor as well as an electrophotographic process using the same.

BACKGROUND OF THE INVENTION

Since electrophotographic photoreceptors employing charge transfer complexes, comprised of 2,4,6-trinitro-9-fluorenone and poly-N-vinylcarbazole, were discovered, development of organic electrophotographic photoreceptors has been progressed, and improvement of sensitivity, durability, and the like of the photoreceptors have increasingly been reported. Further, separate-function type organic photoreceptors have been developed, and heretofore, various compounds have been developed and reported. When referred to charge generating materials related to the present invention, in order to meet requirements for high speed as well as high sensitivity without variations, various azo pigments, condensed polycyclic pigments, various types of phthalocyanine pigments, and the like, have been studied and a number of results have been reported. Developed in each compound group have been those which exhibit relatively high sensitivity. However, apart from the enhancement of the simple charge generating efficiency, all demands for the charge generating material are not satisfied, and still, the problems described below remain unsolved. It is difficult to enhance the purity of the azo pigments. As a result, it is difficult to obtain high level performance without variation.

Condensed polycyclic pigments exhibit excellent stability of electric potential and the like, while due to the short wavelength absorption, they do not exhibit sufficient practical sensitivity for a semiconductor laser beam of 780 nm, which is commonly utilized as a light source for digitization.

Phthalocyanine based pigments exhibit high sensitivity as well as sufficient sensitivity for a 780 nm light source. However, variation of performance due to the difference in ambient conditions such as temperature, humidity, and the like, is relatively large. Further, they have serious problems in which when they are suspended after repeated use for an extended period of time, the electrostatic potential after the first rotation markedly decreases compared to that after the second rotation, and as a result, readily noticed stain due to toner on white background causes an image defects. Said phenomenon, though there is difference in magnitude, has been pointed out as a problem, which are common to phthalocyanines. For example, Japanese Patent Publication Open to Public Inspection No. 10-186703 describes said problem.

Said phenomenon becomes a cause of the problem in which specifically, during reversal development, a copy formed by the first rotation of a photoreceptor is clearly inferior to those formed by the second and subsequent rotations. In order to overcome said problem, a process has inevitably been employed in which the electrostatic potential is stabilized by rotating the photoreceptor one to several times without image formation, and only after the second rotation or several rotations, are images formed. Accordingly, electric power is squandered during the idle rotation of the photoreceptor. Further, time is also wasted until the first image is outputted. Thus, it has been desired to overcome said problems for protection of environment and resources, as well as for achievement of higher speed.

Described in the following is an electrophotographic photoreceptor which comprises a plurality of pigment particles as the embodiment analogous to the present invention. When a plurality of pigment particles, and the like, are mixed and employed, different types of particles which are separately prepared during preparation of particles are blended and a visually uniform state is obtained by employing a means, such as dispersion. Alternatively, different fine particles which are initially obtained by dispersion and the like are blended to obtain a visually uniform state. In Japanese Patent Publication Open to Public Inspection No. 7-128889, by employing said method, gallium phthalocyanine is blended with perylene or anthanthrone to a charge generating layer.

On the other hand, a method is known in which during particle preparation stage, a plurality of materials are blended at the molecular level and thereafter, particles which simultaneously comprise these materials are prepared. The means to blend materials at the molecular level include co-evaporation, acid paste treatment, melt blending, and the like. Examples, in which charge generating materials are prepared employing such methods, are described in Japanese Patent Publication Open to Public Inspection No. 7-114196 (titanyl phthalocyanine/perylenebisimide mixing), Japanese Patent Publication Open to Public Inspection No. 9-157540 (mixing of different types of phthalocyanines), Japanese Patent Publication Open to Public Inspection No. 3-50553 (mixing of different types of phthalocyanines and naphthalocyanines), Japanese Patent Publication Open to Public Inspection No. 7-5715 (mixing of metal-free phthalocyanine/perylenecarboxylic acid diimide, and dimidazole), Japanese Patent Publication Open to Public Inspection No. 8-110649 (mixing of titanyl phthalocyanine/metal-free phthalocyanine), and other methods.

However, the main purpose of these inventions is the formation of novel crystal forms, an increase in the spectral sensitivity region as well as an increase in sensitivity, and said inventions do not disclose any specific means to overcome the aforementioned problems which are common to phthalocyanine based charge generating materials.

Registered Japanese Patent No. 2754739 discloses phthalocyanine particles. The patent teaches the formation of crystal form of phthalocyanines, employing the formation of mixed crystal. The inventor has found that, when mixed crystal particles were employed, problems occurred in which an extreme decrease in chargeability was caused in the registered mixed amount range (between 0.1 and 50 weight parts). There is no suggestion of aforementioned problem corresponding to the rotation time of the photoreceptor.

As described above, when the electrophotographic photoreceptor for digital copiers, employing a semiconductor laser, is prepared, charge generating materials have been desired in which ideal electrophotographic characteristics as well as stability may be compatible with each other.

SUMMARY OF THE INVENTION

An object of the present invention is to provide metal phthalocyanine crystal particles which achieve the performance described below, an electrophotographic photoreceptor employing said crystal particles, and a electrophotographic process which makes it possible to form an acceptable image from the first rotation, employing said photoreceptor.

Even after repeated use, the difference in electrostatic potential between the first rotation and the second and subsequent rotations of the photoreceptor is minimal, forming excellent images after the first rotation.

Variation of characteristics of a photoreceptor during repeated use is minimal and images exhibit minimal variation.

The present invention and the embodiments thereof will now be described.

Metal phthalocyanine crystal particles wherein metal phthalocyanine compound A in an amount of at least 0.001 to less than 0.1 weight part is uniformly dispersed at the molecular level in 100 weight parts of metal phthalocyanine compound B which has a different chemical structure from said metal phthalocyanine compound A.

Metal phthalocyanine compound A preferably has an electron attractive group.

The preferred electron attractive group is a nitro group.

One example of a central metal of metal phthalocyanine compound A is titanium.

Metal phthalocyanine crystal particles preferably have a maximum diffraction peak in the X-ray diffraction spectrum (having a Brag angle of 2θ±0.2 degree) of a CuK α-ray at 27.2 degrees.

Metal phthalocyanine crystal particles preferably have a maximum diffraction peak in the X-ray diffraction spectrum (having a Brag angle of 2θ±0.2 degree) of a CuK α-ray at 27.2 degrees, as well as diffraction peaks at 9.5 degrees and 24.1 degrees.

One example of a production method of metal phthalocyanine crystal particles is that metal phthalocyanine compound A in an amount of at least 0.001 to less than 0.1 weight part and 100 weight parts of metal phthalocyanine compound B, which has a different chemical structure from said metal phthalocyanine compound A, are dissolved in a solvent to prepare a uniform solution, and subsequently, said solution is poured into a bad solvent to form crystal particles.

One example of another production method is that metal phthalocyanine compound A in an amount of at least 0.001 to less than 0.1 weight part, and 100 weight parts of metal phthalocyanine compound B, which has a different chemical structure from said metal phthalocyanine compound A, are dissolved in a solvent to prepare a uniform solution, and subsequently, said solution poured into water to form crystal particles.

The resulting phthalocyanine crystal particles are employed in an electrophotographic photoreceptor.

Employing the resulting electrophotographic photoreceptor, it is possible to form an image from the first rotation of said photoreceptor, employing reversal development.

DETAILED DESCRIPTION OF THE INVENTION

Phthalocyanine crystal particles, which relate to the present invention, will be described.

The metal phthalocyanine crystal particles of the present invention are characterized in being comprised of a metal phthalocyanine compound employed as the main component and a minute amount (in the present invention, said minute amount means that into 100 parts of metal phthalocyanine compound employed as the main component, at least 0.001 to less than 0.1 weight part of a metal phthalocyanine compound having a different chemical structure is incorporated) of a metal phthalocyanine compound having a different chemical structure from the metal phthalocyanine is employed as the main component in their crystals.

Specifically, during the particle preparation stage, different phthalocyanine compounds are subjected to an operation in which they are temporarily blended at the molecular level. Thus, particles obtained by crystallization thereafter are capable of including a phthalocyanine compound having a different chemical structure as well as a different energy level in the particles at the molecular state.

Employed as a means to confirm the fact that the phthalocyanine compound is included into particles at the molecular state is an X-ray diffraction spectrum, in which only peaks due to the metal phthalocyanine crystals employed as the main component are measured. Listed as said means is thermal analysis such as differential thermal analysis (DSC) in which the spectrum is confirmed to be the same as that of the metal phthalocyanine.

It is assumed that due to that analysis, an impurity level is generated in the semiconductor structure of a charge generating material; the charge accumulation at the trap level is lost; and thus problems which are assumed to occur due to charge accumulation at the trap level in the charge generating layer may be solved.

Further, the metal phthalocyanine crystal particles of the present invention are subjected to dispersion treatment, and the like, so that particle sizes are decreased to a state in which a photosensitive layer, which causes no image, defects can be formed. Even after decreasing the particle size, a plurality of types of phthalocyanine compounds are naturally incorporated into the particles. On the other hand, only when different particles are simply mixed and dispersed, it is assumed that even though the size of a plurality of pigments decreases, particles exist independently. Even though one part of particles forms coagula or penetrate into the interior of particles under dissolved state, it is possible to predict that uniformly dispersed state at the molecular level as phthalocyanine particles of the present invention may not be formed.

In fact, only when the charge generating layer is formed by simply blending two types of phthalocyanine compounds at the same ratio described in the present invention and subsequently dispersed, it has been impossible to solve the aforementioned problems as described in the present invention.

The metal phthalocyanine crystal particles of the present invention comprise a minimal amount of phthalocyanine having a different energy level. Originally, it is known that impurities, which are incorporated into the interior of particles of a charge generating material in the molecular or semi-molecular state, greatly affect original charge generating mechanism; under a large amount of incorporation, the charge generating material employed as the main component suffers from large variation of original characteristics such as the extreme decrease in chargeability, variations of sensitivity as well as spectral sensitivity, and the like; and as a result, characteristics required for a photoreceptor are degraded.

Therefore, in the present invention, by incorporating a minimal amount of additives which result in optimal variation of characteristics, accomplishment has been made in which further excellent potential performance is exhibited, while maintaining basic characteristics of the charge generating materials.

Selected as metal phthalocyanines, which are added in a minimal amount, are those having various structures depending on problems to be solved. Employed as central metal may be titanium, aluminum, and gallium, and all others which are capable of becoming the central metal.

Further, employed as substituents of metal phthalocyanines, which are added in a minimal amount, may be both of electron donating groups and electron attractive groups, depending on problems to be solved. Specifically, with overcoming the aforementioned V12 problem, preferably employed are electron attractive groups such as halogens, nitro, cyano fluorinated alkyl, and the like. Of these, a nitro group is preferably employed which exhibits excellent effects.

Listed as electron attractive groups employed in the present invention may be, for example, those which preferably have a σp value of substituents of at least 0.2. Electron attractive groups having said value include, for example, an acyl group, an acyloxy group, a carbdamoyl group, an alkoxycarbonyl group, an aryloxycarbonyl group, a cyano group, a nitro group, an alkylsulfinyl group, an arylsulfinyl group, an alkylsulfonyl group, an arylsulfonyl group, a sulfamoyl group, a halogenated alkyl group, a halogenated alkyloxy group, a halogenated alkylthio group, a halogenated aryloxy group, a halogenated aryl group, an aryl group as well as a heterocyclic group substituted with at least two nitro groups. Of these, more preferred groups include an acyl group, an alkoxycarbonyl group, a nitro group, a cyano group, an arylsulfonyl group, a carbamoyl group, and a halogenated alkyl group. Of these, a nitro group is particularly preferred.

When a main component is unsubstituted titanyl phthalocyanine, preferred results are obtained by adding a small amount of phthalocyanine having an electron attractive group. Though the reasons are not understood yet, it is assumed that a molecular dispersion state in crystal particles as well as an energy-level corresponding to an optimal impurity level is provided by the substituent.

When the metal phthalocyanine crystal particles of the present invention are employed as charge generating materials, no difference in chargeability between the first rotation and the second rotation of the photoreceptor after suspension during repeated use is minimized. Further, during repeated use for an extended period of time, excellent electrophotographic performance is maintained. Based on these excellent characteristics, it is possible to provide electrophotographic images with minimal variation under conditions of high speed electrophotographic processing.

In the present invention, the metal phthalocyanine crystal particles may be employed as a charge generating material of the photoreceptor having various layer construction. A multi-layer type photoreceptor may be prepared by providing a carrier transport layer on the carrier generating layer. Further, a single-layer photoreceptor may be prepared by employing dispersion prepared by dispersing a mixture comprised of the carrier generating material, carrier transport material, and other additives. A photoreceptor may be prepared by providing the charge generating layer on the carrier transport layer. In any of the layer structures, a protective layer may be provided on the photosensitive layer. Further, an interlayer may be provided between an electrically conductive substrate and the photosensitive layer.

During the formation of a photosensitive layer, the carrier generating layer is effectively prepared by employing methods in which a coating composition may be coated, which is prepared by finely dispersing only a carrier generating material, or said carrier generating material together with binders and additives, into a suitable dispersion medium, or a carrier generating material is subjected to vacuum evaporation. In the case of the former, employed as a dispersing means may be homogenizers such as an ultrasonic homogenizer, a ball mill, a sand mill, a homomixer, and the like.

Furthermore, the carrier transport layer may be formed by coating a solution prepared by dissolving only a carrier transport material or said carrier transport material together with binders and additives employing an applicator, a bar coater, a dip coater, a ring coater, and the like. An interlayer, a charge generating layer, a protective layer, and the like may be formed in the same manner as the above.

Polymers which are useful as binders employed in a photosensitive layer as well as in a protective layer include, for example, polystyrene resins, acrylic resins, methacrylic resins, vinyl chloride resins, vinyl acetate resins, polyvinyl butyral resins, epoxy resins, polyurethane resins, phenol resins, polyester resins, alkyd resins, polycarbonate resins, silicone resins, and melamine resins, and copolymers comprising at least two repeating units thereof. Further, in addition to these insulating resins, cited are polymeric organic semiconductors such as polyvinyl-N-carbazole and the like.

Employed as dispersion media for the carrier generating materials well as the carrier transport materials may be, for instance, hydrocarbons such as toluene and xylene; halogenated hydrocarbons such as methylene chloride and 1,2-dichloromethane; ketones such as methyl ethyl ketone and cyclohexanone; esters such as ethyl acetate and butyl acetate; alcohols and derivatives thereof such as methanol, ethanol, propanol, butanol, methyl cellosolve and ethyl cellosolve; ethers such as tetrahydrofuran, 1,4-dioxane, 1,3-dioxolan; amines such as pyridine and diethylamine; nitrogen containing compounds such as amidos, for example, N,N-dimethylformamide and the like; fatty acids, phenols; and sulfur and phosphorus compounds such as carbon disulfide, trimethyl phosphate, and the like. These may be employed individually or in combination.

The content ratio of the carrier generating material to the binder is preferably between 1 and 600 weight parts per 100 weight parts of the binder. The content ratio of the carrier transport material to the binder is preferably between 10 and 500 weight-parts per 100 weight parts of the binder. The thickness of the carrier generating layer is preferably between 0.01 and 20 $\mu$m. The thickness of the carrier transport layer is generally between 1 and 100 $\mu$m, and is preferably between 5 and 50 $\mu$m. In the case of a single layer type electrophotographic photoreceptor, the ratio of binder: additive: carrier generating material: carrier transport material is preferably 100:1 to 200:1 to 200:1 to 200. The thickness of the formed photosensitive layer is preferably between 5 and 50 $\mu$m.

Employed as electrically conductive supports may be a metal plate and a metal drum, and in addition, those prepared by providing electrically conductive compounds such as electrically conductive polymers, indium oxide, and the like, or a thin layer of metal such as aluminum, palladium, and the like onto a substrate such as paper, plastic film, and the like, employing means such as coating, deposition, laminating, and the like.

Employed as carrier transport materials of the photosensitive layer of the present invention may be any of several compounds such as triphenylamine derivatives, triphenylamine-styryl derivatives, hydrazone derivatives, tetraphenylbenzidine, butadiene derivatives, and the like.

Further, antioxidants may be incorporated into the photosensitive layer. Cited as antioxidants are hindered phenols, hindered amines, paraphenylenediamines, hydroquinones, organic phosphorus compounds, and the like.

Furthermore, the photoreceptor may contain other additives such as UV.absorbers to protect the photosensitive layer, as well as spectral sensitivity correcting dyes.

In the present invention, at least 0.001 to less than 0.1 weight part of metal phthalocyanine compound A and 100 weight parts of metal phthalocyanine compound B having a different chemical structure from said phthalocyanine compound A are dissolved in a solvent such as sulfuric acid and the like to prepare a uniform solution. Subsequently, said solution is poured into a bad solvent or water to obtain crystal particles. Thus, the metal phthalocyanine crystal particles of the present invention are produced.

Bad solvents employed in the present invention mean solvents which do not dissolve all of one part of a metal phthalocyanine compound in a volume of 10 times or more. Specifically, methanol, and the like, are employed as bad solvents.

Synthesis Examples of the metal phthalocyanine crystal particles of the present invention will now be described below.

Synthesis Example 1

Tetranitro-substituted titanyl phthalocyanine (0.028 g) and 30 g of titanyl phthalocyanine were placed in 300 ml of concentrated sulfuric acid maintained at 5 to 10° C., and the resulting mixture was stirred for additional one hour at 5 to 10° C. The resulting sulfuric acid solution was filtered employing a glass filter. After removing undissolved materials, the resulting solution was poured into 9 liters of water while maintaining water temperature below 30° C. Resulting deposit particles were collected by filtration and washed with 3 liters of water three times. A wet cake collected by filtration was placed in a solvent consisting of 500 ml of orthodichlorobenzene and 200 ml of water, and heated while stirring at 70° C. for 6 hours. The resulting mixture was placed in 3 liters of methanol and sufficiently washed with methanol. Subsequently, the resulting particles were dried to obtain 24 g of Metal Phthalocyanine Crystal Particles (1).

Synthesis Example 2

Metal Phthalocyanine Crystal Particles (2) (26.5 g) was obtained in the same manner as Synthesis Example 1, except that tetranitro-substituted titanyl phthalocyanine was replaced with tetrachloro-substituted titanyl phthalocyanine.

Synthesis Example 3

Metal Phthalocyanine Crystal Particles (3) (26.5 g) was obtained in the same manner as Synthesis Example 1, except that tetranitro-substituted titanyl phthalocyanine was replaced with tetrabromo-substituted titanyl phthalocyanine.

Synthesis Example 4

Metal Phthalocyanine Crystal Particles (4) (26.5 g) was obtained in the same manner as Synthesis Example 1, except that tetranitro-substituted titanyl phthalocyanine was replaced with tetrafluoro-substituted titanyl phthalocyanine.

Synthesis Example 5

Metal Phthalocyanine Crystal Particles (5) (26.5 g) was obtained in the same manner as Synthesis Example 1, except that tetranitro-substituted titanyl phthalocyanine was replaced with a mixture of nitro-substituted titanyl phthalocyanines having the different number (1 to 4) of substituents.

Synthesis Example 6

Metal Phthalocyanine Crystal Particles (6) (30.5 g) was obtained in the same manner as Synthesis Example 1, except that tetranitro-substituted titanyl phthalocyanine was replaced with tetraethoxy-substituted titanyl phthalocyanine.

Synthesis Example 7

Metal Phthalocyanine Crystal Particles (7) (30.5 g) was obtained in the same manner as Synthesis Example 1, except that the amount of tetranitro-substituted titanyl phthalocyanine was varied to 0.015 g.

Synthesis Example 8

Metal Phthalocyanine Crystal Particles (8) (30 g) was obtained in the same manner as Synthesis Example 6, except that tetranitro-substituted titanyl phthalocyanine was replaced with tetranitro-substituted vanadyl phthalocyanine.

Synthesis Example 9

Particles were prepared in the same manner as Synthesis Example 1 until washing after the acid paste. After temporarily drying, the resulting particles were refluxed while stirring in 500 ml of for 6 hours. Further, after sufficiently washing with methanol, the resulting particles were dried to obtain 23.8 g of Metal Phthalocyanine Crystal Particles (9).

Synthesis Example 10

A wet cake was prepared in the same manner as Synthesis Example 1 until washing after the acid paste. The resulting wet cake was heated at 70° C. while stirring for one hour in 500 ml of xylene.

The resulting cake was continually heated for additional three hours while utilizing an azeotropic mixture consisting of water and xylene, and then poured into 3 liters of methanol. Deposit crystal particles were sufficiently washed with methanol, and subsequently dried to obtain 24 g of Metal Phthalocyanine Crystal Particles (10).

After synthesizing mixed pigment particles, the crystal form of the metal phthalocyanine crystal particles of the present invention may be varied to a desired one, employing a means such as a suitable solvent treatment and the like.

EXAMPLES

The present invention will specifically be explained with reference to examples. "Parts" in the present examples means "weight parts" unless otherwise specified.

Preparation of Photoreceptor 1

Employing a wire bar, an about 0.5 μm thick interlayer comprised of copolymerized nylon CM8000 (manufactured by Toray Industries, Inc.) was provided on a PET film deposited with aluminum. Employing a wire bar, coated onto the resulting interlayer was a dispersion prepared by dispersing a mixture comprised of 2 parts of the metal phthalocyanine crystal particle (1), 1 part of butyral resin, 70 parts of acetic-t-butylate, and 30 parts of 4-methoxy,4-methyl,2-pentanone, employing a sand mill. Subsequently coated, employing a doctor blade, onto the charge generating layer was a solution prepared by dissolving 0.65 part of a carrier transport material (Compound A) represented by the structure shown below, and 1 part of polycarbonate resin "IUPILON Z200" (manufactured by Mitsubishi Gas Kagaku Inc.) in 7.5 parts of dichloroethane. An about 24 μm thick charge transport layer was formed, and thus Photoreceptor Example 1 was prepared. Examples 2 through 10.

Photoreceptors were prepared in the same manner as Example 1, except that metal phthalocyanine crystal particle (1) was replaced with the metal phthalocyanine crystal particles shown in Table 1.

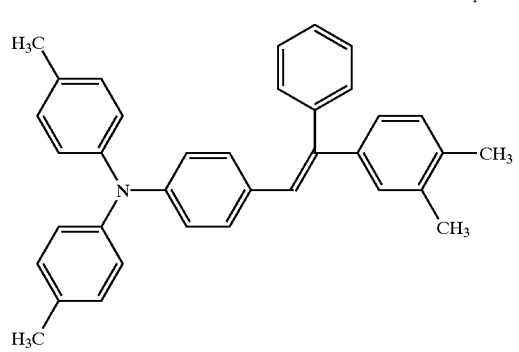

Compound (A)

Preparation of Comparative Example A

Comparative Photoreceptor Example A was prepared in the same manner as Example 1, except that the metal phthalocyanine crystal particle 1 was replaced by a composition prepared by dispersing a mixture comprised of tetranitro substituted titanyl phthalocyanine and titanyl phthalocyanine having a maximum peak at 27.30 and peaks at 9.5° and 24.1° of Bragg angle 2θ±0.20 with respect to CuKα specific X-ray with the same ratio of Synthesis example 1.

X ray diffraction spectrum with respect to CuKα specific X-ray was measured by means of X ray diffraction apparatus JDX-82 (manufactured by JEOL Ltd.).

Preparation of Comparative Example B

Comparative Photoreceptor Example B was prepared in the same manner as Example 1, except that the metal phthalocyanine crystal particle 1 was replaced by a phthalocyanine crystal prepared in the same manner of Synthesis Example 1 except that the amount of the tetranitro substituted titanyl phthalate was changed to 0.3 g.

Preparation of Comparative Example C

Comparative Photoreceptor Example C was prepared in the same manner as Example 1, except that the metal phthalocyanine crystal particle 1 was replaced by titanyl phthalocyanine having a maximum peak at 27.3° and peaks at 9.5° and 24.1° of Bragg angle 2θ±0.20 with respect to CuKα specific X-ray solely.

Sample photoreceptors 1 to 10 and comparative photoreceptors A, B and C were evaluated in the following manner.

Evaluation Method of Photoreceptors

In order to confirm the stability of potential during the repetition of charging, exposure, and charge elimination, the following evaluation was carried out.

Each of Photoreceptors 1 through 10 and Comparative Photoreceptors A through C was earthed and adhered on an aluminum drum in a modified Konica-7150 (in which an electrometer was installed to measure the surface potential of each photoreceptor). At ambient conditions of a temperature of 24° C. and a relative humidity of 54 percent, the process, consisting of charging, exposure, and charge elimination, was repeated 6,000 times. At the start and after said repetition, said machine was suspended for ten minutes, and the electrostatic potential VH1 after the first rotation of each photoreceptor and the electrostatic potential VH2 after the second rotation of the same were measured. Table 1 shows the obtained results.

TABLE 1

| Photo-receptor No. | Metal Phthalo-cyanine Crystal Particles | At Start | | | After 10-minute Suspension after 6,000 Repetitions | | |
|---|---|---|---|---|---|---|---|
| | | VH1 | VH2 | VH2-VH1 | VH1 | VH2 | VH2-VH1 |
| 1 | 1 | 725 | 729 | 4 | 727 | 729 | 2 |
| 2 | 2 | 732 | 737 | 5 | 733 | 745 | 12 |
| 3 | 3 | 727 | 731 | 4 | 730 | 740 | 10 |
| 4 | 4 | 729 | 731 | 2 | 731 | 740 | 9 |
| 5 | 5 | 733 | 735 | 2 | 733 | 739 | 6 |
| 6 | 6 | 736 | 743 | 7 | 706 | 744 | 38 |
| 7 | 7 | 730 | 735 | 5 | 730 | 738 | 8 |
| 8 | 8 | 722 | 727 | 5 | 728 | 732 | 4 |
| 9 | 9 | 729 | 738 | 9 | 730 | 735 | 5 |
| 10 | 10 | 713 | 720 | 7 | 722 | 729 | 7 |
| A | — | 736 | 749 | 13 | 698 | 740 | 42 |
| B | — | 586 | 574 | −12 | 556 | 570 | 14 |
| C | — | 728 | 745 | 17 | 704 | 748 | 44 |

From the results in Table 1, it reveals that compared to Comparative Photoreceptors A through C, Photoreceptors 1 through 10 of the present invention minimize the difference in the electric potential between the first rotation and the second rotation, and exhibit marked effects for the V12 problem. Further, it is found that particularly, in Comparative Photoreceptor B, the chargeability is extremely lowered and basic characteristics of titanyl phthalocyanine employed as the main component is markedly degraded.

Example 2

Preparation of Photoreceptor 11

A resin interlayer comprised of copolymerization nylon CM8000 (manufactured by Toray Co.) was provided at a coated resin weight of 7 mg/100 cm2 onto a cylindrical aluminum base body employing dip coating. Onto the resulting interlayer applied was a composition prepared by dispersing a mixture of two parts of Metal Phthalocyanine Crystal Particles (1), one part of butyral resin, 70 parts of t-butyl acetate, and 30 parts of 4-methoxy-4-methyl-2-pentanone, employing a sand mill to form a charge generating layer so as to have an absorbance of approximately 2 at a wavelength of 780 nm. Subsequently, onto the charge generating layer applied was a composition prepared by dissolving 0.65 part of a charge transport material (Compound A) and one part of polycarbonate resin "IUPIRON Z200" (manufactured by Mitsubishi Gas Kagaku Co.) in 7.5 parts of dichloroethane, employing dip coating to form an approximately 24 μm thick charge transport layer, and thus the Photoreceptor 11 of the present invention was prepared.

Preparation of Comparative Photoreceptor D

A resin interlayer comprised of copolymerization nylon CM8000 (manufactured by Toray Co.) was provided at a coated resin weight of 7 mg/100 cm$^2$ onto a cylindrical aluminum base body employing dip coating. Onto the resulting interlayer applied was applied was a composition prepared by dispersing a mixture of two parts of titanyl phthalocyanine exhibiting a maximum peak at 27.3 degrees of a Bragg angle 2θ±0.2 degree for CuKα characteristic X-ray and diffraction peaks at 9.5 degrees and 24.1 degrees, one part of butyral resin, 70 parts of t-butyl acetate, and 30 parts of 4-methoxy-4-methyl-2-pentanone, employing a sand mill to form a charge generating layer so as to have an absorbance of approximately 2 at a wavelength of 780 nm. Subsequently, onto the charge generating layer applied was a composition prepared by dissolving 0.65 part of a charge transport material (Compound A) and one part of polycarbonate resin "IUPIRON Z2000" (manufactured by Mitsubishi Gas Kagaku Co.) in 7.5 parts of dichloroethane, employing dip coating to form an approximately 24 μm thick charge transport layer, and thus Comparative Photoreceptor was prepared.

In order to confirm the image stability of the aforementioned samples during repeated copying, 10,000 copies were produced at ambient conditions of a temperature of 54° C. and a relative humidity of 54 percent, employing a modified Konica-7150 (in which an electrometer was installed to make it possible to measure the surface potential of the photoreceptor). At the start, and after 10-minute suspension, copied images after the first rotation and the second rotation were compared. Table 2 shows the obtained results.

TABLE 2

| Photo-receptor No. | Metal Phthalo-cyanine Crystal Particles | At Start | | After 10-minute Suspension after 6,000 Repetitions | |
|---|---|---|---|---|---|
| | | Image after 1st Rotation | Image after 2nd Rotation | Image after 1st Rotation | Image after 2nd Rotation |
| 11 | 1 | good | good | good | good |
| D | 2 | good | good | high background stain | good |

The results in Table 2 show that the comparative photoreceptor results in high background stain after the first rotation of said photoreceptor after 6,000 repetitions, and good images are only obtained after the second rotation thereof, while after 10-minutes after image formation of 6,000 repetitions, the photoreceptor of the present invention makes it possible to obtain a good image after the first rotation of said photoreceptor.

According to the present invention, it has become possible to provide an electrophotographic photoreceptor as well as an electrophotographic process which minimizes difference in chargeability between the first rotation and the second and subsequent rotations of said photoreceptor after repeated use, and is capable of forming an excellent image after the first rotation, and further minimizes variation of characteristics of said photoreceptor during repeated use, and produces images without variation, and metal phthalocyanine crystal particles which are employed therefore and a production method thereof.

What is claimed is:

1. An electrophotographic photoreceptor comprising a support and, provided thereon, a photosensitive layer containing composite metal phthalocyanine crystal particle wherein metal phthalocyanine compound A in an amount of at least 0.001 to less than 0.1 weight part is uniformly dispersed at the molecular level in 100 weight parts of a main metal phthalocyanine compound B which has a different chemical structure from said metal phthalocyanine compound A, said metal phthalocyanine compound A has an electron attractive group and said composite has a minimal amount of a metal phthalocyanine compound with an electron attractive group, said minimal amount being at least 0.001 to less than 0.1 weight parts based on 100 weight parts of said main compound.

2. The electrophotographic photoreceptor of claim 1 wherein the electron attractive group is a nitro group.

3. The electrophotographic photoreceptor of claim 1 wherein a central metal of metal phthalocyanine compound A is titanium.

4. An image forming method employing the electrophotographic photoreceptor of claim 1, comprising forming image from the first rotation of said photoreceptor by means of reversal development.

5. A composite metal phthalocyanine crystal particle wherein metal phthalocyanine compound A in an amount of at least 0.001 to less than 0.1 weight part is uniformly dispersed at the molecular level in 100 weight parts of a main metal phthalocyanine compound B which has a different chemical structure from said metal phthalocyanine compound A inside said crystal particle, said metal phthalocyanine compound A has an electron attractive group and said composite has a minimal amount of a metal phthalocyanine compound with an electron attractive group, said minimal amount being at least 0.001 to less than 0.1 weight parts based on 100 weight parts of said main compound.

6. The metal phthalocyanine crystal particle of claim 5 wherein the electron attractive group is a nitro group.

7. The metal phthalocyanine crystal particle of claim 5 wherein a central metal of metal phthalocyanine compound A is titanium.

8. The metal phthalocyanine crystal particle of claim 5 which has a maximum diffraction peak in the X-ray diffraction spectrum (having a Brag angle of 2θ±0.2 degree) of a CuK α-ray at 27.2 degrees.

9. The metal phthalocyanine crystal particle of claim 5 which has a maximum diffraction peak in the X-ray diffraction spectrum (having a Brag angle of 2θ±0.2 degree) of a CuK α-ray at 27.2 degrees, as well as diffraction peaks at 9.5 degrees and 24.1 degrees.

10. An electrophotographic photoreceptor comprising a support and, provided thereon, a photosensitive layer containing composite metal phthalocyanine crystal particle consisting essentially of metal phthalocyanine compound A and metal phthalocyanine compound B, wherein metal phthalocyanine compound A in an amount of at least 0.001 to less than 0.1 weight part is uniformly dispersed at the molecular level in 100 weight parts of metal phthalocyanine compound B which has a different chemical structure from said metal phthalocyanine compound A and said metal phthalocyanine compound A has an electron attractive group.

* * * * *